US007015810B2

(12) United States Patent
Su

(10) Patent No.: US 7,015,810 B2
(45) Date of Patent: Mar. 21, 2006

(54) CONTROL SYSTEM WITH HOT PLUG SIGNAL TRANSMISSION CHANNEL FOR REACTION EQUIPMENT AND MONITORING DEVICE THEREOF

(75) Inventor: Wen-Wei Su, Guei Shan (TW)

(73) Assignee: Exon Science Incorporation, Taoyuan (TW)

( * ) Notice: Subject to any disclaimer, the term of this patent is extended or adjusted under 35 U.S.C. 154(b) by 133 days.

(21) Appl. No.: 10/724,717

(22) Filed: Dec. 2, 2003

(65) Prior Publication Data

US 2005/0116824 A1 Jun. 2, 2005

(51) Int. Cl.
*G08B 1/08* (2006.01)
*H04Q 7/00* (2006.01)

(52) U.S. Cl. .................. 340/539.11; 340/603; 340/605

(58) Field of Classification Search ........... 340/539.11, 340/514, 605, 603; 702/188
See application file for complete search history.

(56) References Cited

U.S. PATENT DOCUMENTS

| | | | | |
|---|---|---|---|---|
| 4,821,769 | A * | 4/1989 | Mills et al. | 137/554 |
| 5,017,908 | A * | 5/1991 | Macpherson | 340/605 |
| 5,255,722 | A * | 10/1993 | Furstenberg | 141/114 |
| 5,449,017 | A * | 9/1995 | Collins et al. | 137/312 |
| 5,844,490 | A * | 12/1998 | Lu et al. | 340/603 |
| 6,888,453 | B1 * | 5/2005 | Lutz et al. | 340/506 |

* cited by examiner

*Primary Examiner*—John Tweel, Jr.
(74) *Attorney, Agent, or Firm*—Troxell Law Office, PLLC

(57) ABSTRACT

A control system (2) used for reaction equipment (20) and a monitoring device thereof are disclosed. The control system is connected to a computer (3) by signal, and includes the monitoring device and a portable alarm (24). The monitoring device includes a detector (21) for detecting the reaction action proceeded in the reaction equipment and outputting a detected value, an abnormal state assertor (22) in communication with the detector for giving an abnormal signal when the detected value is in the range of an abnormal state, and a wireless signal emitter (23) in communication with the abnormal state assertor for transmitting a wireless signal when receiving the abnormal signal. The wireless signal is received by the portable alarm and the portable alarm gives a warning signal to inform the user carrying with it.

13 Claims, 4 Drawing Sheets

CONTROL SYSTEM WITH HOT PLUG SIGNAL TRANSMISSION CHANNEL FOR REACTION EQUIPMENT AND MONITORING DEVICE THEREOF

BACKGROUND OF THE INVENTION

1. Field of the Invention

The present invention relates to a control system and a monitoring device thereof, and particularly relates to a control system with hot plug signal transmission channel used for reaction equipment and a monitoring device thereof.

2. Description of Prior Art

With the rapid progress of biochemical technology, many biochemical equipments for time-consuming chemical reaction, biologic fermentation, microbe culture and separation purification have been developed. In order to efficiently monitor important values which may vary and affect the result, such as temperature, pressure, oxygen content and pH values, during the process of chemical reaction, biologic fermentation, microbe culture and separation purification actions, many biochemical equipments as shown in FIG. 1 are each provided with a plurality of detectors 11 to momentarily detect the above-mentioned important values for the user's reference. However, the action time of the aforesaid various actions is very tedious, and therefore it is difficult for the user to rivet his attention so that abnormal phenomenon can be momentarily noticed. Therefore, a warning device 12 (as shown in the functional block diagram of FIG. 1) is disposed on the biochemical equipment 10 to momentarily give a warning signal, for example, warning sound or warning light flash etc., when a predetermined abnormal phenomenon occurs, such as when the temperature is higher than a threshold value. Thus, the user may be informed to immediately take responsive measures to prevent uncurable errors occurring.

However, as the radiating range of warning signals is limited, the user's moving range is thus seriously restricted to cause inconvenience to the user. Accordingly, the main purpose of the present invention is to address this problem encountered in the prior art.

SUMMARY OF THE INVENTION

One aspect of the present invention relates to a monitoring device used between a reaction equipment and a computer. The monitoring device comprises a detector for detecting the reaction action proceeded in the reaction equipment and outputting a detected value, an abnormal state assertor in communication with the detector for giving an abnormal signal when the detected value is in the range of the abnormal state, and a signal transmission channel electrically connected with the detector and/or the abnormal state assertor for transmitting the detected value and/or the abnormal signal to the computer for processing. The signal transmission channel supports the computer's plug and play function.

According to the above concept, the detector of the monitoring device of the present invention may be at least one of a temperature detector, a pressure detector, an oxygen content detector, a pH value detector, a whisking speed detector, a gas flux detector, a liquid level detector, a transfusion device detector, a valve ON-and-OFF detector, a power cut detector, a cell density detector, a gas detector, a slotware or pipeline breakage detector, a dextrose or sucrose detector and an online real-time analytical sampling device detector. The detector is adapted to detect the reaction action proceeded in the reaction equipment and output a detected temperature value, a detected pressure value, a detected oxygen content value, a detected pH value, a whisking speed variation control signal, a gas flux variation control signal, a liquid level variation control signal, a transfusion device control signal, a value ON-and-OFF control signal, a power cut responsive control signal, a cell density variation control signal, a gas concentration control signal, a slotware or pipeline breakage responsive control signal, a dextrose or sucrose variation control signal or an online real-time analytical sampling device control signal.

According to the above concept, the abnormal state assertor of the monitoring device of the present invention gives the abnormal signal when the detected value exceeds the normal range.

According to the above concept, the reaction equipment, which the monitoring device of the present invention is applied to, may be a chemical reaction equipment, a biologic fermentation reaction equipment, a microbe culture equipment, a polymerase chain reaction, a reverse transcriptase polymerase chain reaction, a real time polymerase chain reaction or a separation purification equipment.

According to the above concept, the signal transmission channel of the monitoring device of the present invention is a USB (Universal Serial Bus), an IEEE1394 (Institute of Electrical and Electronic Engineers) bus, a LAN (Local Area Network) bus or a CAN (Controller Area Network) bus.

Another aspect of the present invention relates to a monitoring device used between a reaction equipment and a computer. The monitoring device comprises a detector for detecting the reaction action proceeded in the reaction equipment and outputting a detected value, an abnormal state assertor in communication with the detector for giving an abnormal signal when the detected value is in the range of the abnormal state, and a signal transmission channel electrically connected between the detector and/or the abnormal state assertor and the computer for transmitting a control instruction outputted by the computer to the detector and/or the abnormal state assertor for controlling. The signal transmission channel supports the computer's plug and play function.

A further aspect of the present invention relates to a monitoring device used between a reaction equipment and a computer. The monitoring device comprises a detector for detecting the reaction action proceeded in the reaction equipment and outputting a detected value, an abnormal state assertor in communication with the detector for giving an abnormal signal when the detected value is in the range of the abnormal state, and an insertable and removable data storage device in communication with the detector and/or the abnormal state assertor for storing the data outputted by the detector and/or the abnormal state assertor and for allowing insertion and removal by the user.

According to the above concept, the monitoring device of the present invention further comprises a signal transmission channel electrically connected between the insertable and removable data storage device and the computer for transmitting the data stored in the insertable and removable data storage device to the computer for storage. The signal transmission channel supports the computer's plug and play function.

Yet another aspect of the present invention relates to a monitoring device used between a reaction equipment and a computer. The monitoring device comprises a detector for detecting the reaction action proceeded in the reaction equipment and outputting a detected value, and a signal transmission channel electrically connected between the detector and the computer for transmitting the detected value to the computer for processing. The signal transmission channel supports the computer's plug and play function.

Yet a further aspect of the present invention relates to a monitoring device used between a reaction equipment and a computer. The monitoring device comprises a detector for detecting the reaction action proceeded in the reaction equipment and outputting a detected value, and a signal transmission channel electrically connected between the detector and the computer for transmitting a control instruction outputted by the computer to the detector for controlling. The signal transmission channel supports the computer's plug and play function.

Still another aspect of the present invention relates to a monitoring device used between a reaction equipment and a computer. The monitoring device comprises a detector for detecting the reaction action proceeded in the reaction equipment and outputting a detected value, and an insertable and removable data storage device in communication with the detector for storing the data outputted by the detector and for allowing insertion and removal by the user.

BRIEF DESCRIPTION OF THE DRAWINGS

The present invention may best be understood through the following description with reference to the accompanying drawings, in which.

DETAILED DESCRIPTION OF THE INVENTION

Figure 1:
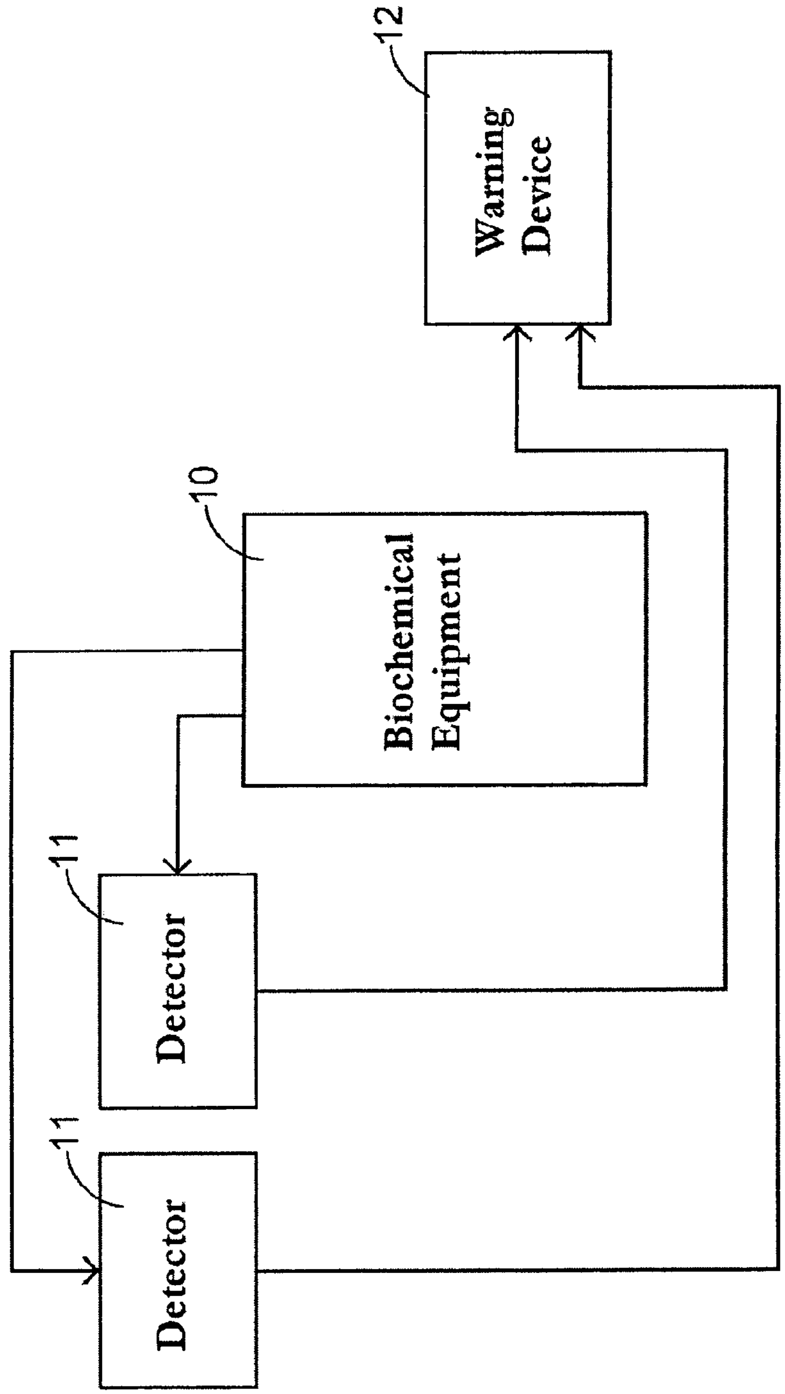
Fig. 1 (Prior Art)
FIG. 1 is a functional block diagram of a conventional biochemical equipment.
Figure 2:
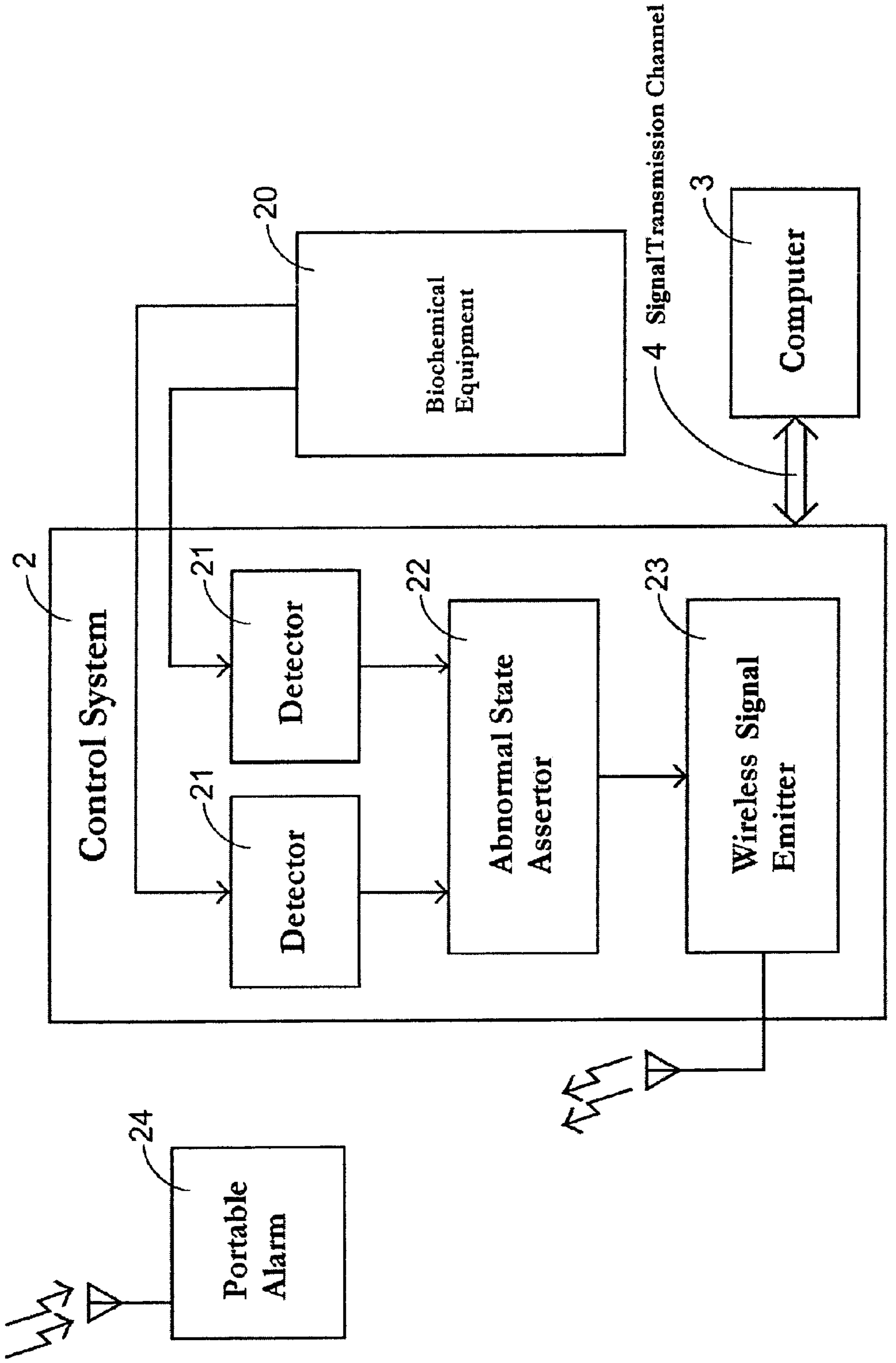
FIG. 2 is a schematic view of a control system configuration in accordance with a first preferred embodiment of the present invention.

FIG. 2 shows a schematic view of a control system in accordance with a first preferred embodiment of the present invention. The control system is primarily applied to biochemical equipment 20 which takes a long time to react, such as chemical reaction equipment, biologic fermentation equipment, microbe culture equipment or separation purification equipment. The control system 2 primarily includes a detector 21, an abnormal state assertor 22, and a wireless signal emitter 23. A signal transmission channel 4 between the control system 2 and a computer 3 may be achieved by wired signal transmission or wireless signal transmission. Accordingly, the computer may receive, record and control the signal value outputted by the control system 2. The wired signal transmission may be accomplished by using the existing plug and play devices, such as USB, IEEE1394, LAN or CAN devices, and the wireless signal transmission may be accomplished by using Bluetooth, IEEE 802.11, IrDA communication or mobile signal communication means such as WAP (Wireless Application Protocol) and GPRS (General Packet Radio Service).

In order to efficiently monitor state variations during the reaction, the biochemical reaction equipment 20 has been furnished with various detectors 21 which include a temperature detector, a pressure detector, an oxygen content detector, a pH value detector, a whisking speed detector, a gas flux detector, a liquid level detector, a transfusion device detector, a valve ON-and-OFF detector, a power cut detector, a cell density detector, a gas detector, a slotware or pipeline breakage detector, a dextrose or sucrose detector or an online real-time analytical sampling device detector. The value detected by the detector 21, such as a temperature value, a pressure value, an oxygen content value, a pH value, a whisking speed variation control signal, a gas flux variation control signal, a liquid level variation control signal, a transfusion device control signal, a value ON-and-OFF control signal, a power cut responsive control signal, a cell density variation control signal, a gas concentration control signal, a slotware or pipeline breakage responsive control signal, a dextrose or sucrose variation control signal or an online real-time analytical sampling device control signal, is transmitted to an abnormal state assertor 22. The abnormal state assertor 22 presets respective normal value ranges corresponding to various kinds of values, such as the above temperature value, pressure value, oxygen content value, pH value, and so on. When one detected value exceeds a corresponding normal value range, the abnormal state assertor 22 transmits a corresponding abnormal signal to the wireless signal emitter 23. The wireless signal emitter 23 then sends a wireless signal to a portable alarm 24, and the portable alarm 24 gives a warning signal after reception, so that the user who carries with it may be informed. Accordingly, the user's moving range may be largely extended, thereby eliminating serious restriction and inconvenience. The wireless signal emitter 23 can be integrated into a computer 3 as well as the control system. Alternatively, the existing wireless transmission module of the computer 3 may be used to perform the wireless signal transmission function.

Figure 3:
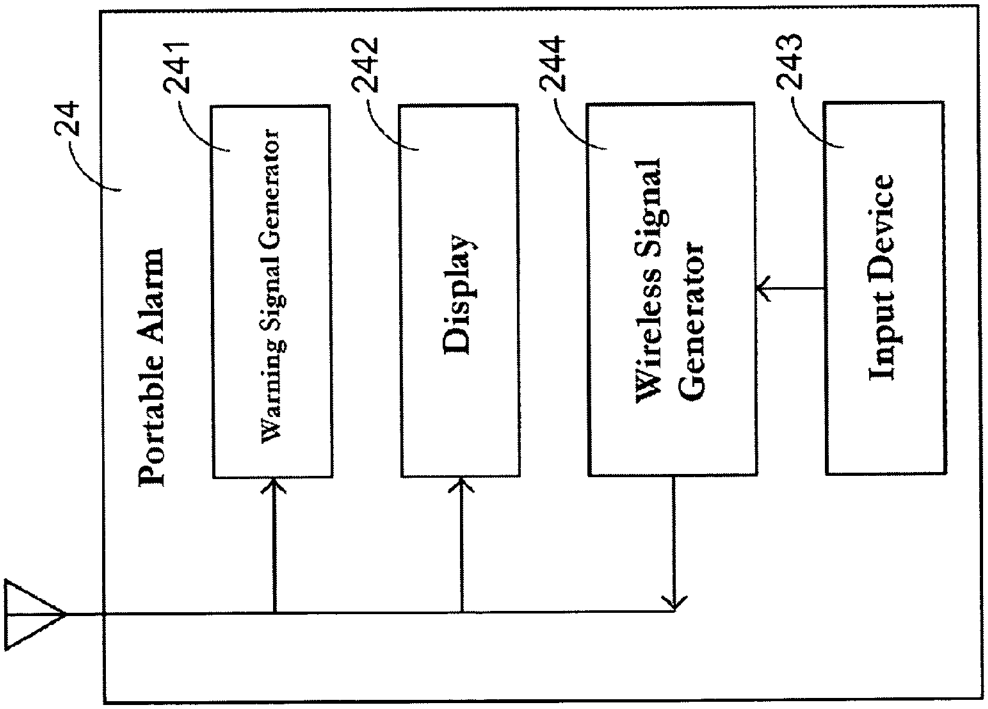
FIG. 3 is a functional block diagram of a portable alarm.

FIG. 3 is a schematic view of the portable alarm 24, wherein a warning signal generator 241 thereof gives a warning signal, such as sound, vibration or light flash, when triggered by the abnormal signal. A display 242 displays corresponding system abnormal information in response to the abnormal signal, such as when exceeding a normal temperature value range. An input device 243 is used for allowing the user to input instructions. A wireless control signal generator 244 communicates with the input device 243 and transmits a wireless control signal to the biochemical reaction equipment 20 in response to the instructions, so that the reaction action proceeded in the biochemical reaction equipment may be adjusted, and continuous occurrence of an abnormal state may be further suppressed by remote control, thereby eliminating the cause of warning signal presence.

The wireless transmission of the wireless signal emitter 23 and the portable alarm 24 may be accomplished by the existing wireless transmission architecture, such as Bluetooth, IEEE 802.11, IrDA communication, wireless call system, or mobile signal communication such as WAP and GPRS. The portable alarm 24 may be in the form of an existing mobile phone, a personal digital assistant, and so on.

Figure 4:
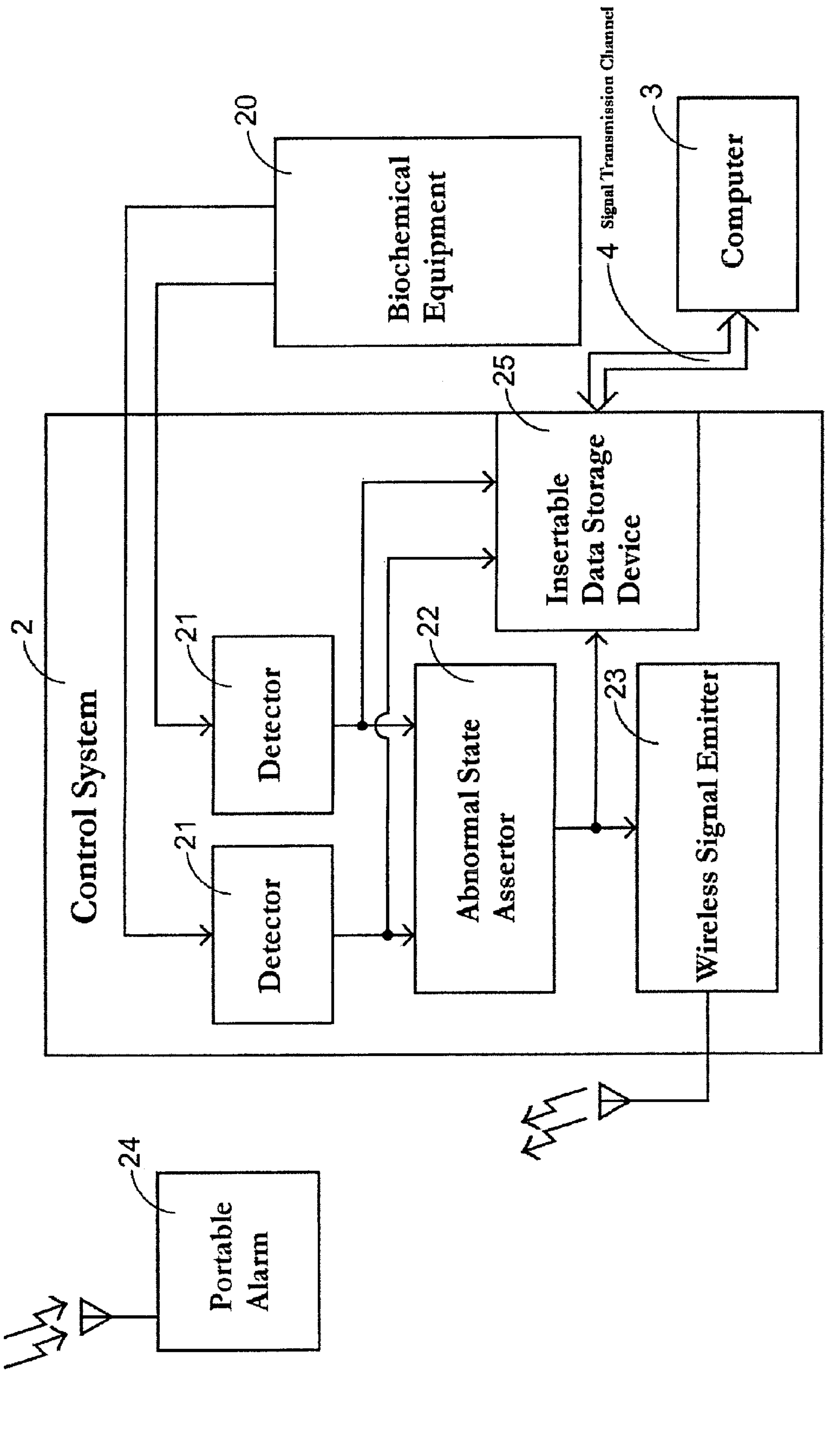
FIG. 4 is a schematic view of a control system configuration in accordance with a second preferred embodiment of the present invention.

FIG. 4 shows a schematic view of a control system in accordance with a second preferred embodiment of the present invention. The difference between the control systems of the first and second embodiments relies in the addition of an insertable and removable data storage device 25 (such as various flash memory modules). The insertable and removable data storage device 25 communicates with the detector 21 and the abnormal state assertor 22 for storing the data outputted by the detector 21 and the abnormal state assertor 22 and for allowing insertion and removal by the user. The data stored by the insertable and removable data storage device 25 is transmitted to the computer for storage via a signal transmission channel 4. The signal transmission channel 4 is identical to that of the first embodiment, and may also be achieved by wired signal transmission or wireless signal transmission. The wired signal transmission may be accomplished by using the existing plug and play devices, such as USB, IEEE1394, LAN or CAN devices, to support the plug and play function of the computer 3. The wireless signal transmission may be accomplished by using Bluetooth, IEEE 802.11, IrDA communication or mobile signal communication such as WAP and GPRS.

As described above, since the control system developed by the present invention and the monitoring device thereof perform the warning and control actions by means of wireless transmission, disadvantages encountered in the prior art are efficiently overcome and the main object of the present invention is thus achieved. The wired signal transmission channel is accomplished by existing USB, IEEE1394, LAN or CAN plug and play devices, which facilitates the insertion and removal actions of the user and thus eliminates the need for restarting the computer.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A monitoring device used between a reaction equipment and a computer, the monitoring device comprising:

a detector detecting the reaction action proceeded in the reaction equipment and outputting a detected value;

an abnormal state assertor in communication with the detector, giving an abnormal signal when the detected value is in the range of an abnormal state; and a signal transmission channel electrically connected with the detector and/or the abnormal state assertor, transmitting the detected value and/or the abnormal signal to the computer for processing, the signal transmission channel supporting the computer's plug and play function.

2. The monitoring device as described in claim 1, wherein the detector is at least one of a temperature detector, a pressure detector, an oxygen content detector, a pH value detector, a whisking speed detector, a gas flux detector, a liquid level detector, a transfusion device detector, a valve ON-and-OFF detector, a power cut detector, a cell density detector, a gas detector, a slotware or pipeline breakage detector, a dextrose or sucrose detector or an online real-time analytical sampling device detector, the detector detecting the reaction action proceeded in the reaction equipment and outputting at least one of a detected temperature value, a detected pressure value, a detected oxygen content value, a detected pH value, a whisking speed variation control signal, a gas flux variation control signal, a liquid level variation control signal, a transfusion device control signal, a value ON-and-OFF control signal, a power cut responsive control signal, a cell density variation control signal, a gas concentration control signal, a slotware or pipeline breakage responsive control signal, a dextrose or sucrose variation control signal or an online real-time analytical sampling device control signal.

3. The monitoring device as described in claim 1, wherein the reaction equipment, which the monitoring device is applied to, is a chemical reaction equipment, a fermentation reaction equipment, a microbe culture equipment, a polymerase chain reaction, a reverse transcriptase polymerase chain reaction, a real time polymerase chain reaction or a separation purification equipment.

4. The monitoring device as described in claim 1, wherein the signal transmission channel is a USB or an IEEE1394 bus, a LAN (Local Area Network) bus or a CAN (Controller Area Network) bus.

5. A monitoring device used between a reaction equipment and a computer, the monitoring device comprising:

a detector detecting the reaction action proceeded in the reaction equipment and outputting a detected value;

an abnormal state assertor in communication with the detector, giving an abnormal signal when the detected value is in the range of an abnormal state; and a signal transmission channel electrically connected between the detector and/or the abnormal state assertor and the computer, transmitting a control instruction outputted by the computer to the detector and/or the abnormal state assertor for controlling, the signal transmission channel supporting the computer's plug and play function.

6. A monitoring device used between a reaction equipment and a computer, the monitoring device comprising:

a detector detecting the reaction action proceeded in the reaction equipment and outputting a detected value;

an abnormal state assertor in communication with the detector, giving an abnormal signal when the detected value is in the range of an abnormal state; and an insertable and removable data storage device in communication with the detector and/or the abnormal state assertor, the insertable and removable data storage device storing the data outputted by the detector and/or the abnormal state assertor and allowing insertion and removal by the user.

7. The monitoring device as described in claim 6, further comprising a signal transmission channel electrically connected between the insertable and removable data storage device and the computer, transmitting the data stored in the insertable and removable data storage device to the computer for storage, the signal transmission channel supporting the computer's plug and play function.

8. A monitoring device used between a reaction equipment and a computer, the monitoring device comprising:

a detector detecting the reaction action proceeded in the reaction equipment and outputting a detected value; and a signal transmission channel electrically connected between the detector and the computer, transmitting the detected value to the computer for processing, the signal transmission channel supporting the computer's plug and play function.

9. The monitoring device as described in claim 8, wherein the detector is at least one of a temperature detector, a pressure detector, an oxygen content detector, a pH value detector, a whisking speed detector, a gas flux detector, a liquid level detector, a transfusion device detector, a valve ON-and-OFF detector, a power cut detector, a cell density detector, a gas detector, a slotware or pipeline breakage detector, a dextrose or sucrose detector or an online real-time analytical sampling device detector, the detector detecting the reaction action proceeded in the reaction equipment and outputting at least one of a detected temperature value, a detected pressure value, a detected oxygen content value, a detected pH value, a whisking speed variation control signal, a gas flux variation control signal, a liquid level variation control signal, a transfusion device control signal, a value ON-and-OFF control signal, a power cut responsive control signal, a cell density variation control signal, a gas concentration control signal, a slotware or pipeline breakage responsive control signal, a dextrose or sucrose variation control signal or an online real-time analytical sampling device control signal.

10. The monitoring device as described in claim 8, wherein the reaction equipment, which the monitoring device is applied to, is a chemical reaction equipment, a fermentation reaction equipment, a microbe culture equipment, a polymerase chain reaction, a reverse transcriptase polymerase chain reaction, a real time polymerase chain reaction or a separation purification equipment.

11. The monitoring device as described in claim 8, wherein the signal transmission channel is a USB or an IEEE1394 bus, a LAN (Local Area Network) bus or a CAN (Controller Area Network) bus.

12. A monitoring device used between a reaction equipment and a computer, the monitoring device comprising:

a detector detecting the reaction action proceeded in the reaction equipment and outputting a detected value; and a signal transmission channel electrically connected between the detector and the computer, transmitting a control instruction outputted by the computer to the detector for controlling, the signal transmission channel supporting the computer's plug and play function.

13. A monitoring device used between a reaction equipment and a computer, the monitoring device comprising:

a detector detecting the reaction action proceeded in the reaction equipment and outputting a detected value; and an insertable and removable data storage device in communication with the detector, storing the detected value outputted by the detector and allowing insertion and removal by the user.

* * * * *